US010266219B2

(12) United States Patent
Van Raden

(10) Patent No.: US 10,266,219 B2
(45) Date of Patent: Apr. 23, 2019

(54) LIFTING JACK ASSEMBLY WITH ROTATABLE HYDRAULIC CYLINDER FOR STEERING AND METHOD OF OPERATION

(71) Applicant: Columbia Trailer Co., Inc., Hillsboro, OR (US)

(72) Inventor: Ken Van Raden, Hillsboro, OR (US)

(73) Assignee: COLUMBIA TRAILER CO., INC., Hillsboro, OR (US)

(*) Notice: Subject to any disclaimer, the term of this patent is extended or adjusted under 35 U.S.C. 154(b) by 81 days.

(21) Appl. No.: 15/296,896

(22) Filed: Oct. 18, 2016

(65) Prior Publication Data

US 2017/0036716 A1 Feb. 9, 2017

Related U.S. Application Data

(63) Continuation of application No. 14/481,797, filed on Sep. 9, 2014, now abandoned.

(60) Provisional application No. 61/875,186, filed on Sep. 9, 2013.

(51) Int. Cl.
B62D 57/032 (2006.01)
E21B 15/00 (2006.01)

(52) U.S. Cl.
CPC .......... B62D 57/032 (2013.01); E21B 15/003 (2013.01)

(58) Field of Classification Search
CPC ............................ B62D 57/032; E21B 15/003
USPC ......................................................... 180/8.4
See application file for complete search history.

(56) References Cited

U.S. PATENT DOCUMENTS 1,715,745 A    6/1929  Edmondson
2,452,632 A   11/1948  Cameron
2,942,676 A    6/1960  Kraus
3,249,168 A    5/1966  Klein et al.
(Continued)

FOREIGN PATENT DOCUMENTS

DE      4109578        9/1992
GB      2106464        4/1983
KR   20110136192       12/2011

OTHER PUBLICATIONS

United States Patent and Trademark Office, Office Action for U.S. Appl. No. 14/481,797, dated Jul. 28, 2015, 17 pages.
(Continued)

Primary Examiner — Joseph M Rocca
Assistant Examiner — Felicia L. Brittman
(74) Attorney, Agent, or Firm — Kolisch Hartwell

(57) ABSTRACT

A lifting jack assembly for use on a walking machine to raise it off the ground and preselect a steering direction before the walking machine is lowered onto the ground for travel therealong includes a hydraulic power-driven lift cylinder for actuating an extendable/retractable rod, wherein the lift cylinder is rotatable about its vertical axis. A roller assembly is provided with rollers mounted to the rod. A foot plate mounted below the roller assembly engages the rollers, and a power-driven shifter mechanism mounted on the foot plate and connected to the roller assembly shifts the roller assembly along the foot plate. A linkage assembly interconnects the lift cylinder to the foot plate. A steering mechanism rotates the lift cylinder about its vertical axis to impart rotation to the foot plate and the roller assembly to orient and fix the direction of travel of the walking machine in a preselected direction.

11 Claims, 10 Drawing Sheets

(56) References Cited

U.S. PATENT DOCUMENTS

| | | | |
|---|---|---|---|
| 3,255,836 | A | 6/1966 | Hoppmann et al. |
| 3,332,248 | A | 7/1967 | Burnett |
| 3,446,301 | A | 5/1969 | Thomas |
| 3,576,225 | A | 4/1971 | Chambers |
| 3,638,747 | A | 2/1972 | Althoff |
| 3,830,324 | A | 8/1974 | Chambers |
| 3,853,196 | A | 12/1974 | Guest |
| 3,921,739 | A | 11/1975 | Rich et al. |
| 4,048,936 | A | 9/1977 | Uchizono et al. |
| 4,381,723 | A | 5/1983 | Furst |
| 4,423,560 | A | 1/1984 | Rivinius et al. |
| 5,468,099 | A | 11/1995 | Wheetley et al. |
| 5,492,436 | A | 2/1996 | Suksumake |
| 5,839,532 | A | 11/1998 | Yoshiji et al. |
| 5,921,336 | A | 7/1999 | Reed |
| 6,581,525 | B2 | 6/2003 | Smith |
| 7,481,285 | B1 | 1/2009 | Savage |
| 7,681,674 | B1 | 3/2010 | Barnes et al. |
| 7,806,207 | B1 | 10/2010 | Barnes et al. |
| 7,819,209 | B1 | 10/2010 | Bezner |
| 8,051,930 | B1 * | 11/2011 | Barnes ................ B62D 57/028 180/8.3 |
| 8,490,724 | B2 | 7/2013 | Smith et al. |
| 8,561,733 | B2 | 10/2013 | Smith et al. |
| 8,573,334 | B2 | 11/2013 | Smith et al. |
| 2002/0185319 | A1 | 12/2002 | Smith |
| 2010/0252395 | A1 | 10/2010 | Lehtonen et al. |
| 2010/0300843 | A1 | 12/2010 | Mustonen et al. |
| 2011/0136192 | A1 | 6/2011 | Paul et al. |
| 2013/0153309 | A1 | 6/2013 | Smith et al. |
| 2013/0156539 | A1 | 6/2013 | Smith et al. |
| 2013/0277124 | A1 | 10/2013 | Smith et al. |
| 2014/0262562 | A1 * | 9/2014 | Eldib ...................... E21B 7/02 180/8.5 |
| 2017/0327166 | A1 * | 11/2017 | Smith ................... E21B 15/003 |

OTHER PUBLICATIONS

United States Patent and Trademark Office, Office Action for U.S. Appl. No. 14/481,797, dated Apr. 18, 2016, 12 pages.

* cited by examiner

LIFTING JACK ASSEMBLY WITH ROTATABLE HYDRAULIC CYLINDER FOR STEERING AND METHOD OF OPERATION

CROSS-REFERENCE TO RELATED APPLICATIONS

This application is a continuation of U.S. patent application Ser. No. 14/481,797 and entitled LIFTING JACK ASSEMBLY WITH ROTATABLE HYDRAULIC CYLINDER FOR STEERING AND METHOD OF OPERATION, which claims priority to U.S. Provisional Patent Application Ser. No. 61/875,186 and entitled ROTATING CYLINDER STEERING SYSTEM, the disclosures of which are incorporated herein by reference.

BACKGROUND OF THE DISCLOSURE

The present disclosure is directed to lifting jack assemblies which may be used on large walking machines operable for transporting massive and heavy loads, upwards of thousands of tons, over the ground. Walking machines are designed as non-wheeled, power-driven vehicles fabricated from iron and steel, and carry and sequentially transport huge structures such as oil drilling rigs and their support or service modules to pre-drilled, ground-installed conductor pipes. This may be done prior to drilling well bores in fields undergoing oil exploration, or over existing well bores in previously worked-over fields, or the like.

Walking machines generally are provided with multiple lifting jack assemblies which operate to raise and lower the apparatus and its substructure for transporting it along the ground in a straight line or steered in a selected direction. The walking machine is steered so that it is moved to align or orient equipment such as a drilling rig precisely above a well bore, or move to another area entirely. The lifting assemblies provided on known walking machines utilize lift cylinders with extendable/rods operable to raise and lower foot plates for engaging the ground, and a shifter mechanism operates to impart travel of the machine along the foot plates.

Examples of Prior Art Walking Machines and Systems

There are numerous examples of walking machines and systems which have been designed for use in moving drilling rigs for positioning over well bores during oil exploration. An example of a known walking machine is disclosed in U.S. Pat. No. 6,581,525 where a load-carrying transport apparatus for moving a heavy load, such as an oil drilling rig, over a surface includes a substructure for carrying the load, a track member positioned on the surface adjacent the substructure and a plurality of lift assemblies mounted on the substructure selectively operable for extension toward the surface to engage the track member and raise the substructure above the surface so that it is carried on the track member. The lift assemblies are also operable for retraction to lower the substructure onto the surface.

A shifter mechanism disposed adjacent to the substructure and the track member is selectively operable for displacing the substructure along the track member when the lifting assemblies have been extended toward the surface to raise the substructure above the surface. The shifter mechanism is also operable for displacing the track member on the surface relative to the substructure when the lifting assemblies have been retracted and disengaged from the track member. The track member is dimensioned to provide a steering area and at least one of the lifting assemblies is selectively positionable to a predetermined angle within a range for moving in the steering area along the track member so that the load-carrying apparatus can be steered along a selected direction.

Another example of a walking machine is disclosed in U.S. Pat. No. 5,921,336 in which a drilling rig substructure is provided with a plurality of lifting jacks, and each lifting jack is connected to a jack pad. Roller assemblies are mounted at the lower end of the lifting jacks and each jack pad has a center beam that the roller assemblies engage. The jack pads are rotatable in 360° about a vertical axis. A push-pull mechanism extends between each jack pad and each roller assembly to move the rollers horizontally in relation to the jack pad. In operation, when it is desired to move to a well bore, the lifting jacks are extended, forcing the jack pad against the ground.

Continued extension causes the upper end of the lifting cylinder to raise the substructure and accompanying drilling rig to move from ground level. The lifting jacks now remain in the extended position and the push-pull mechanisms are then actuated to move the substructure in a given direction. The lifting jacks are then retracted so that the substructure returns to the ground and the jack pad is then raised and moved to a new position.

A further example of the prior art is U.S. Pat. No. 7,819,209 which describes a guided transport unit for moving a superstructure in angular movements over a surface. There is disclosed a skid pad, a vertical displacing member engaged with the skid pad, a base operatively associated with the vertical displacing member, and a directional actuator. The base includes a planar element for engaging the surface over which the superstructure is transported, and a carrier for moving the vertical displacing member and skid pad relative to the surface. The disclosure shows that the side walls of the skid pads are provided with openings to enable the guided main structures to pivoted to extend at least partially outside of the skid pads.

SUMMARY OF THE DISCLOSURE

The present disclosure is directed to a lifting jack assembly for use on a walking machine to raise it off the ground and preselect a direction for steering before the walking machine is lowered back onto the ground for travel. Multiple ones of these lifting jack assemblies are required for use on walking machines, and the present disclosure details the construction and design of one of these only. A principal feature of the lifting jack assembly is that is designed with a rotatable hydraulic cylinder for providing the steering capability. The lifting jack assembly is constructed with the following components.

A hydraulic power-driven lift cylinder is mounted on the walking machine operable for actuating an extendable/retractable rod, extension of the rod facilitates raising of the walking machine and retraction will enable the walking machine to be lowered to the ground. The lift cylinder is rotatable about its vertical axis and this will provide the steering function, to be described. A roller assembly provided with rollers is mounted adjacent a lower end of the rod, and a foot plate is mounted below the roller assembly for engaging the rollers. A power-driven shifter mechanism is mounted on the foot plate and is connected to the roller assembly selectively operable for shifting the roller assembly in a preselected horizontal direction along the foot plate.

A linkage assembly is provided to interconnect the lift cylinder to the foot plate. This is necessary so that a steering mechanism including a drive mechanism connected to the cylinder may operate to rotate the cylinder about its vertical axis to a preselected position with the linkage assembly simultaneously transferring or imparting the same amount of rotation to the foot plate and the roller assembly as a unit, thereby to orient and fix the direction of travel of the walking machine in a preselected direction.

The above construction enables rotation of the lift cylinder to fix the orientation of the steering because the lifting cylinder imparts its degree of rotation to be transferred to the foot plate. Stated in terms of method terminology, here is how the system operates with a plurality of lifting jack assemblies, each as described above, mounted on a walking machine. First, the rods of the lift cylinders are retracted to raise and disengage their respective foot plates from the ground and thereby lower the walking machine so that it engages the ground and is supported thereon. Next, the lift cylinders are rotated about their vertical axes to a preselected position whereby the linkage assemblies simultaneously impart the rotation to their associated foot plates and roller assemblies as a unit to orient and fix the direction of travel of the walking machine in a preselected direction.

The rods of the lift cylinders are now extended to urge the foot plates against the ground and thereby lift the walking machine off the ground with its weight being supported by the lifting jack assemblies. The walking machine now is shifted along the foot plates in the preselected direction of travel established by rotation of the lift cylinders, and this process can be continuously repeated.

The steering system of the present disclosure is designed to enable steering by the unique method of rotating the lift cylinders, in a selected one of multiple modes, namely, longitudinal steering, simple steering, transverse steering, complementary steering, crab steering and circular steering. To implement the orientation necessary for each of these steering modes, the lifting jack assemblies first must be raised so that their foot plates disengage from the ground, as described above. The lift cylinders are then rotated to orient the foot plates in the desired steering mode, i.e., longitudinal steering, simple steering, etc.

DETAILED DESCRIPTION OF THE PREFERRED EMBODIMENT

As stated at the outset, the present disclosure is directed to the design of a lifting jack assembly for use on a walking machine, which along with multiple similar lifting jack assemblies will be used to raise a walking machine off the ground to be supported solely by foot plates provided on the end of each lifting jack assembly. The lifting jack assemblies are designed with a unique steering system which enables preselection of a steering orientation before the walking machine is lowered onto the ground for travel in the preselected direction. The preselected mode may be longitudinal steering, simple steering, etc. The drive mechanism includes a slew drive maintained in position on the first mounting plate by stationary ring mount members.

Preselection of the steering direction is accomplished by rotation of the lift cylinders on the lifting jack assemblies, about their vertical axes, as shown in the construction that follows. It is to be understood that a walking machine, in the context of the large structures contemplated here, will be non-wheeled machines in which lifting jack assemblies of the present disclosure will be utilized. The drawings which follow show a wheeled structure on which a single lifting jack assembly is mounted, but such lifting jack assemblies normally would be mounted in multiple units on the large, spaced apart beams of a walking machine.

Figure 1:
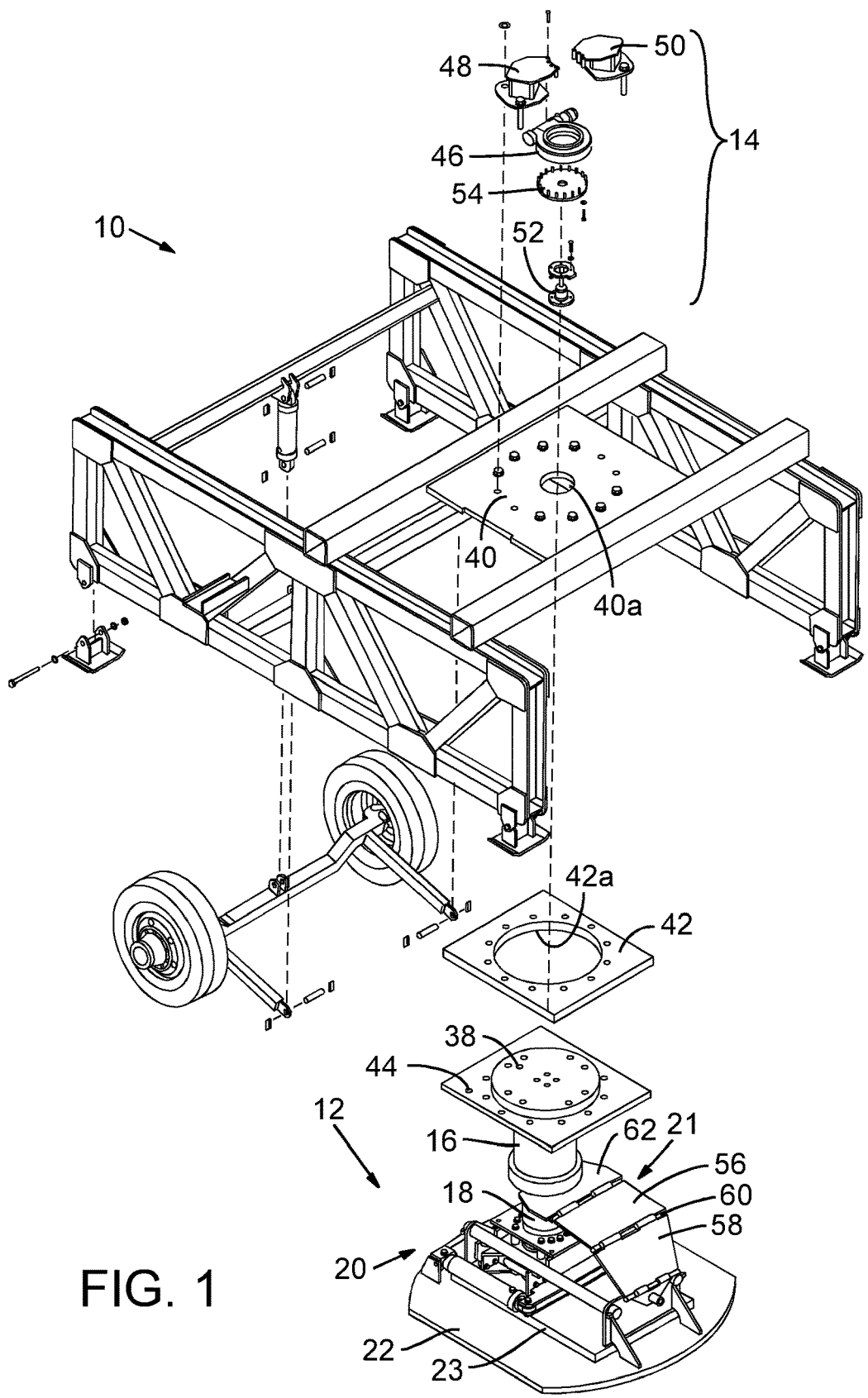
FIG. 1 is a perspective view of a structure showing a wheeled frame to support a prototype of the lifting jack assembly and its components, portions being shown in an exploded view for purposes of illustration in accordance with the present disclosure.

As shown in FIG. 1, a test frame structure is illustrated generally at 10, with portions shown detached or in an exploded view. As mentioned, a walking machine would not include wheels for transport, and the structure at 10, which is shown with wheels, is provided to test the operability of a single lifting jack assembly in accordance with the present disclosure. Hydraulic pumps and lines, plus other control mechanisms necessary for operation of the system are not illustrated in the drawings, it being understood that such are conventional.

Figure 2:
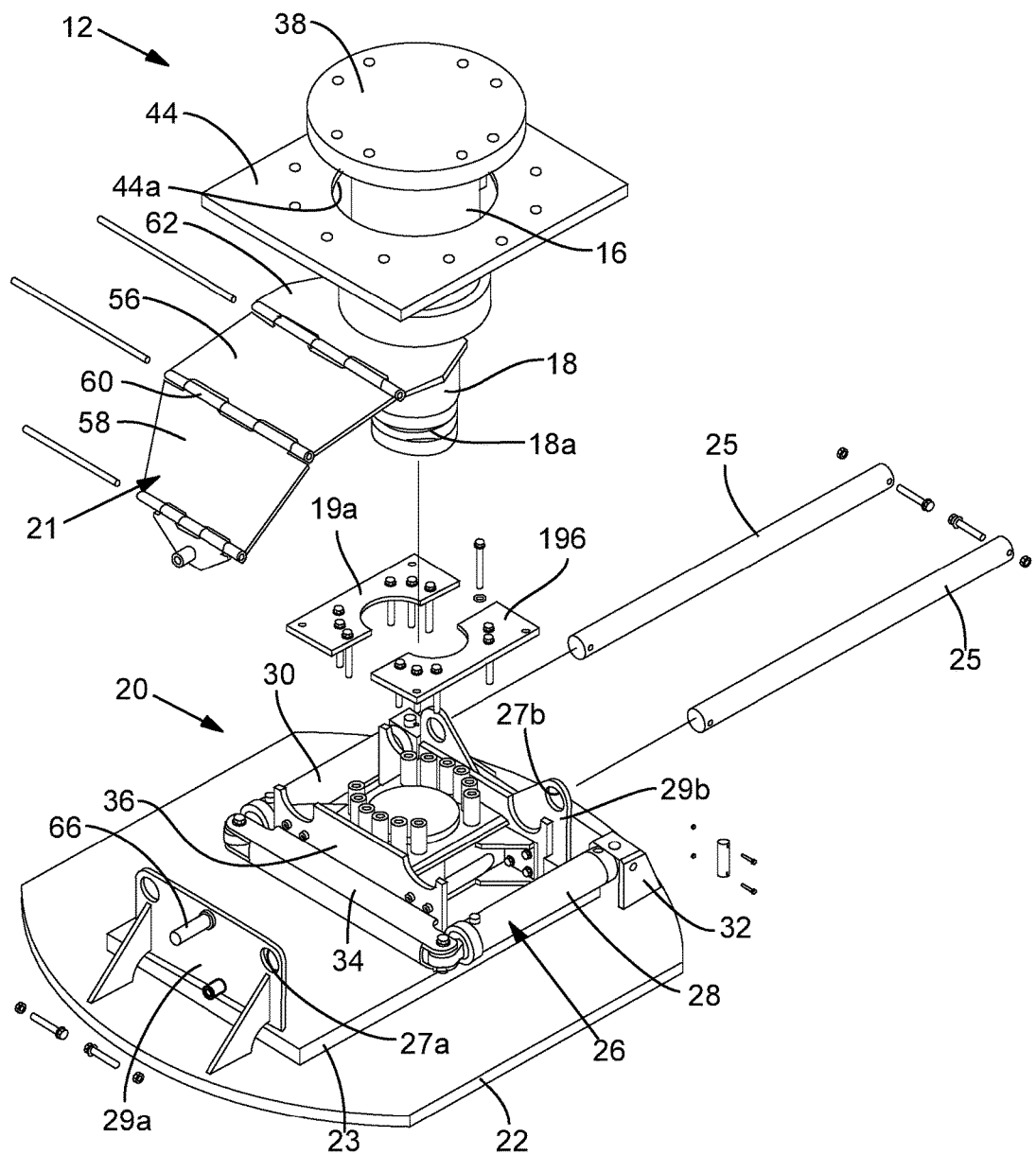
FIG. 2 is an exploded view of the lifting jack assembly showing the lift cylinder, roller assembly, foot plate and linkage assembly designed to interconnect the lift cylinder with the foot plate in accordance with the present disclosure.

A lifting jack assembly with steering capability is generally indicated at 12 (see FIG. 2 also) and a drive mechanism for actuating steering is indicated at 14, with components and operation to be described. A hydraulic power-driven lift cylinder to be mounted on a walking machine is shown at 16, operable for actuating an extendable/retractable rod, which is partially hidden in FIG. 1, but shown at 18 in the exploded view of FIG. 2. FIG. 1 shows a fully assembled roller assembly generally indicated at 20, and a foot plate 22. In FIG. 2, the foot plate is shown with a roller pad 23 mounted below the roller assembly for engaging rollers, indicated at 24 which can be seen in the isolated side view of the lifting jack assembly of FIG. 3.

The exploded view of FIG. 2 also shows how rod 18 of lift cylinder 16 is connected to the roller assembly and thence to the foot plate. This is accomplished by forming an end of rod 18 with a circumferential groove 18a to enable a pair of opposed, receiving plates 19a and 19b, having arcuate interior sides or edges, to engage those edges with the groove and permit rotation of roller assembly 20 and foot plate 22 when the receiving plates have been suitably mounted via bolts and spacers to the roller assembly. The roller assembly, which is shiftable along the foot plate, is maintained in position above the foot plate by elongate, opposed stabilizer or guide bars 25 which may be assembled through aligned bores, two of which are shown at 27a and 27b, provided in spaced-apart upright brackets or mounts 29a and 29b.

Figure 3:
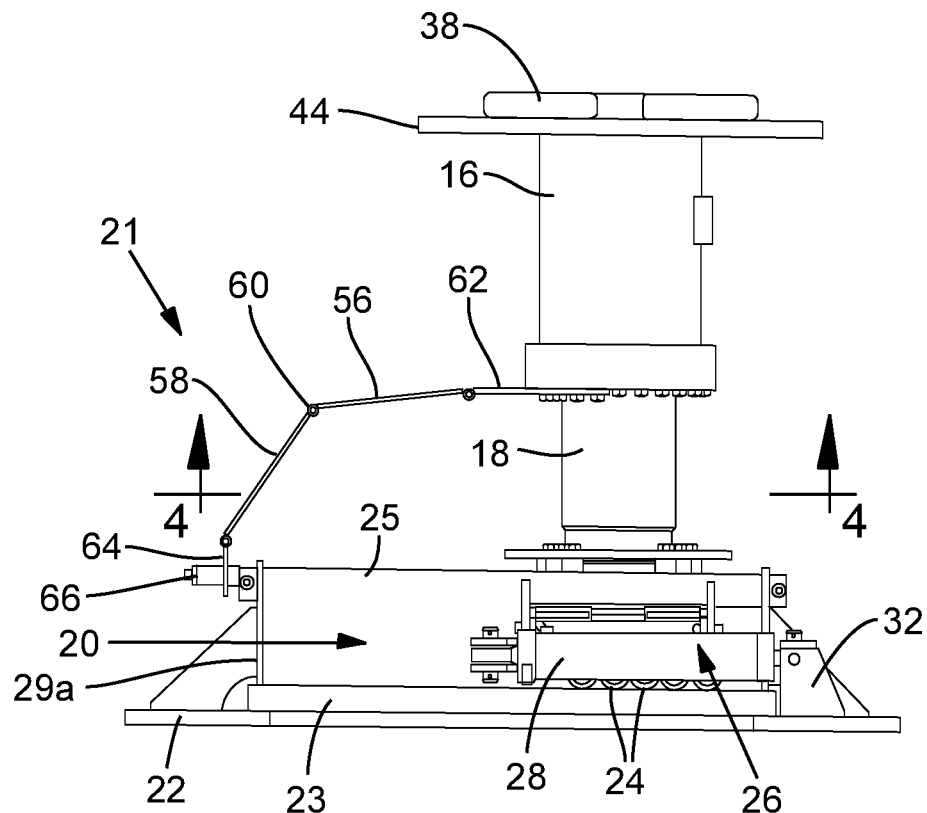
FIG. 3 is a side elevation view of the lifting jack assembly, with the lift cylinder, roller assembly, foot plate and linkage assembly designed to interconnect the lift cylinder with the foot plate in accordance with the present disclosure.

As shown in FIGS. 2 and 3, a power-driven shifter mechanism indicated at 26, comprises a pair of travel cylinders 28 and 30 each selectively operable to extend or retract an associated rod for rectilinear shifting or translating roller assembly 20 along foot plate 20. An end of each travel cylinder is connected to the foot plate, by brackets, one of which is shown at 32 in FIGS. 2 and 3. The end of each rod of a travel cylinder is connected by an arm 34 to an end plate 36 of roller assembly 20. As shown in both FIGS. 2 and 3, the travel cylinders have been actuated to retract their respective rods, thereby retracting roller assembly to the right of foot plate 22. Shifter mechanism 26 can now be operated so that the travel cylinders can shift the roller assembly in a preselected horizontal direction along the foot plate. The travel cylinder is selectively operable for extending the rod to shift the roller assembly in a first direction relative to the foot plate and for retracting the rod to shift the roller assembly in a second direction opposite to the first direction relative to the foot plate.

Figure 4:
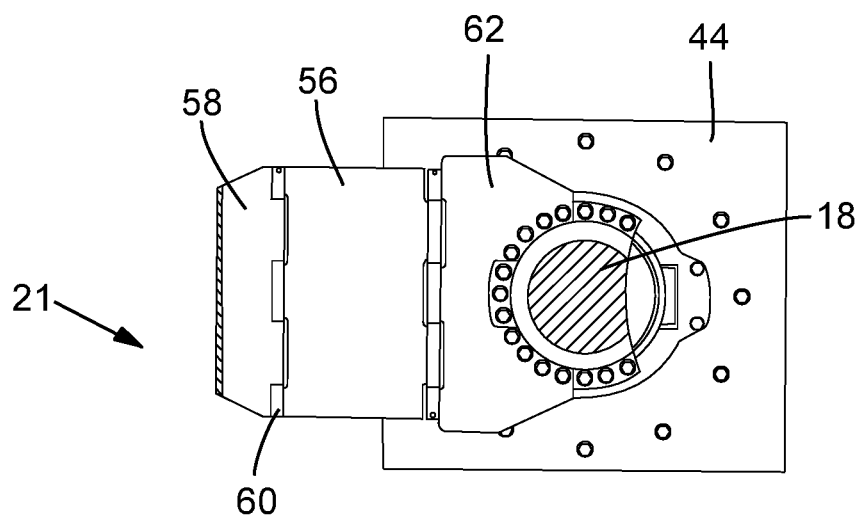
FIG. 4 is a cross-sectional view taken along lines A-A of FIG. 3, and illustrates connection of the linkage assembly to the lift cylinder in accordance with the present disclosure.

It is to be understood that the construction of the roller assembly, foot plate and shifter mechanism are essentially conventional. What the present disclosure will now focus on is components of the lift cylinder and the steering mechanism including drive mechanism 14 as shown in FIG. 1. Operation of a linkage assembly 21 and details of its construction, as shown in FIGS. 2-4, will then be described, as a principal focus is the manner in which the linkage assembly interconnects lift cylinder 16 to foot plate 22, and how the drive mechanism is interconnected to rotate lift cylinder 16.

As shown in FIG. 1, a cylindrical flange 38 is formed at the upper end of lift cylinder 16, and a housing structure for mounting on a walking machine provides a bearing for engaging the flange and thereby enabling lift cylinder 16 to be rotated about its vertical axis to a predetermined position. The housing structure includes a first mounting plate 40 supported by beams or otherwise on the walking machine, here represented by the test structure. First mounting plate 40 is provided with a central bore 40a for concentric alignment with the vertical axis of lift cylinder 16, and is dimensioned for receiving a drive shaft from a drive mechanism to be described.

A spacer plate 42 is suitably connected to first mounting plate 40 and is spaced-apart therefrom, and a central bore 42a is dimensioned to receive flange 38 concentric therewith to permit it to rotate freely therewithin. A second mounting plate 44 is secured to first mounting plate 40 and separated therefrom by the spacer plate. Second mounting plate 44 includes a central bore 44a dimensioned with a diameter less than the outer diameter of flange 38 (see FIG. 6) and is concentrically aligned with the vertical axis of lift cylinder 16 for receiving and retaining the lift cylinder. A bottom surface 38a of flange 38 engages the upper surface of second mounting plate 44 (see FIG. 6).

As shown in FIG. 1, drive mechanism 14 is supported on first mounting plate 40 above flange 38 and includes a drive shaft assembly connected to flange 38 operable for rotating lift cylinder about 16 about its vertical axis to a preselected position. Drive mechanism includes a slew drive 46 maintained in position on the first mounting plate by stationary ring mounts 48 and 50. The drive shaft assembly includes a drive shaft 52 keyed or otherwise connected to a rotatable member 54 rotatable upon actuation of slew drive 46. Drive shaft 52 extends through central bore 40a of first mounting plate 40 and central bore 42a for connection to flange 38 of lift cylinder 38 thereby to impart rotation to the flange and the lift cylinder from slew drive 46.

While a slew drive and a shaft assembly have been described above, it is to be understood that other types of drive mechanisms could be employed for imparting rotation to the lift cylinder. Such systems could include chain and gear drives, direct in-line mounted motors, belt/pulley arrangements and others. The important aspect is that that there is a drive mechanism operatively connected to the flange of the lift cylinder to impart rotation to the lift cylinder about its vertical axis.

The linkage assembly, which is indicated generally at 21 in FIGS. 1-3 interconnects lift cylinder 16 to foot plate 22 and includes first and second hinge plates 56 and 58, respectively, pivotally connected to each other along a hinge axis 60, wherein first hinge plate 56 is also pivotally connected to lift cylinder 16 via a bracket 62 which is rigidly connected to the lift cylinder. Second hinge plate 58 is also pivotally connected to a bracket 64 which includes a bore for slidably receiving a trunnion mount 66 which extends from bracket 29a provided on foot plate 22.

The above construction of linkage assembly 21 ensures that rotation of lift cylinder 16 by the drive mechanism simultaneously imparts rotation to foot plate 22 to orient it in a desired steered position, be it longitudinal steering, simple steering, transverse steering, complementary steering, crab steering or circular steering, regardless of the extent of extension or retraction of rod 18 relative to the lift cylinder. This feature is accomplished because first and second hinge plates 56 and 58, respectively, are dimensioned lengthwise to pivot away from one another about their common pivot connection as the rod is extended, and pivot or fold toward one another as the rod is retracted. Moreover, the hinged construction enables connection between the lift cylinder and the foot plate when the roller assembly shifts along the foot plate.

The Rotatable Cylinder and Linkage Assembly in Operation

Figure 9:
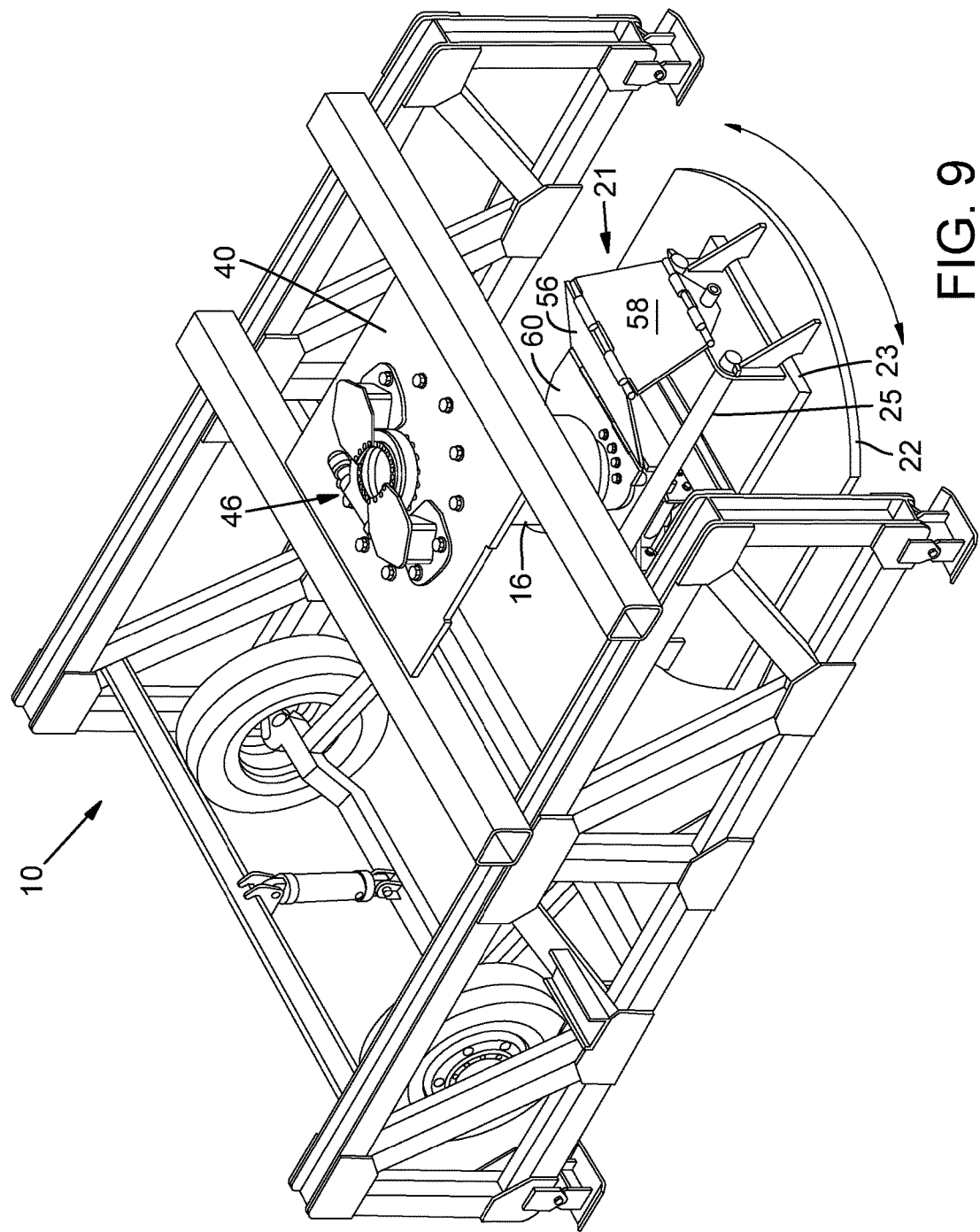
FIG. 9 is a perspective view of the lifting jack assembly mounted on a test frame to simulate its mounting on a walking machine and corresponds to the configuration shown in FIG. 5 in accordance with the present disclosure.
Figure 10:
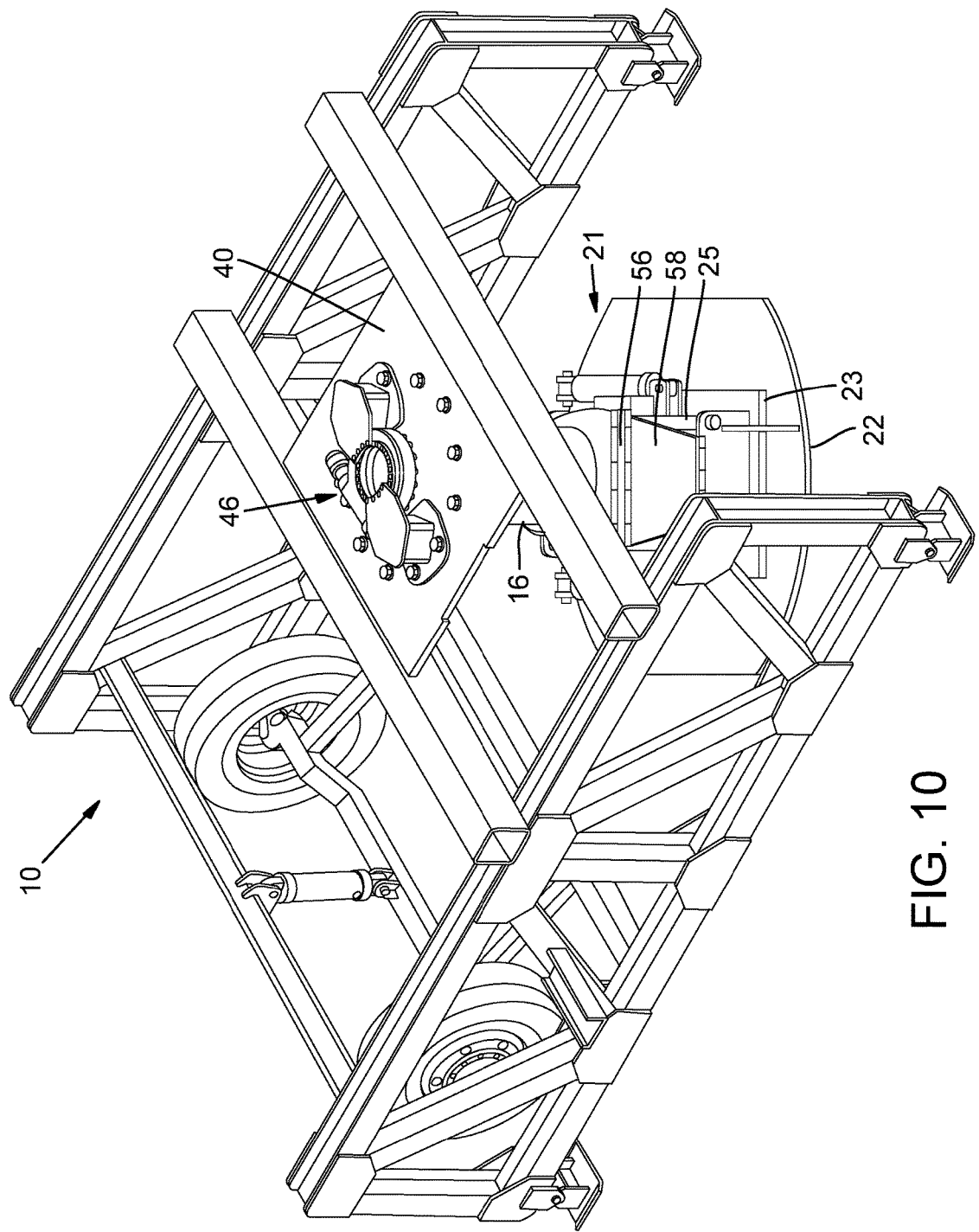
FIG. 10 is a perspective view of the lifting jack assembly mounted on a test frame showing rotation of the foot plate in one direction in accordance with the present disclosure.
Figure 11:
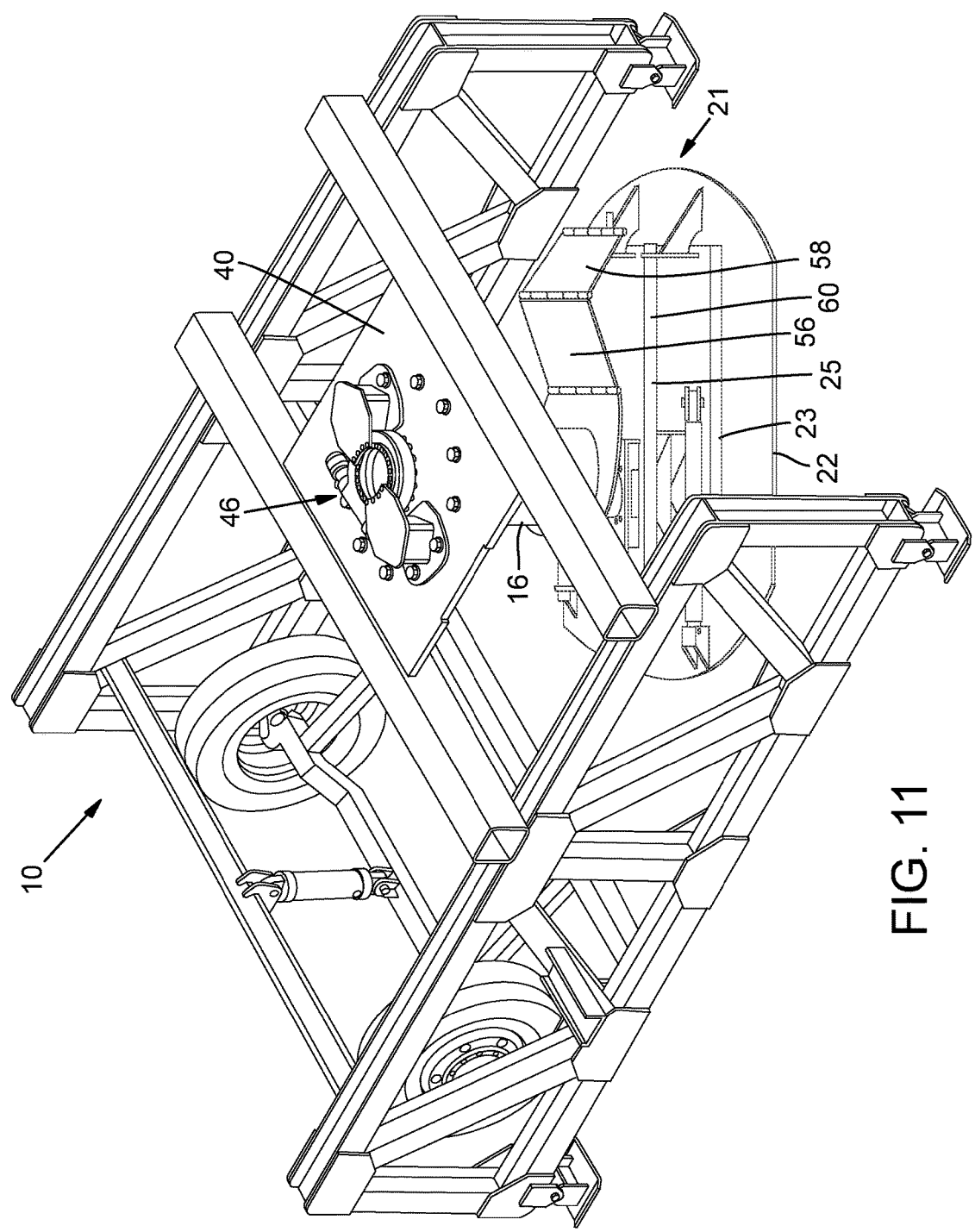
FIG. 11 is a perspective view of the lifting jack assembly mounted on a test frame similar to the view of shown in FIG. 10 showing rotation of the foot plate in direction opposite to that shown in FIG. 10 in accordance with the present disclosure.

The following describes operation of the lifting jack assembly of the present disclosure for use on a walking machine to raise it off the ground and preselect a steering direction before the walking machine is lowered onto the ground for travel along whatever steering mode has been selected. A series of the steps is illustrated in FIGS. 9-11, showing a single lifting jack assembly, however multiples operating essentially in unison will be the case on a walking machine proper.

Figure 5:
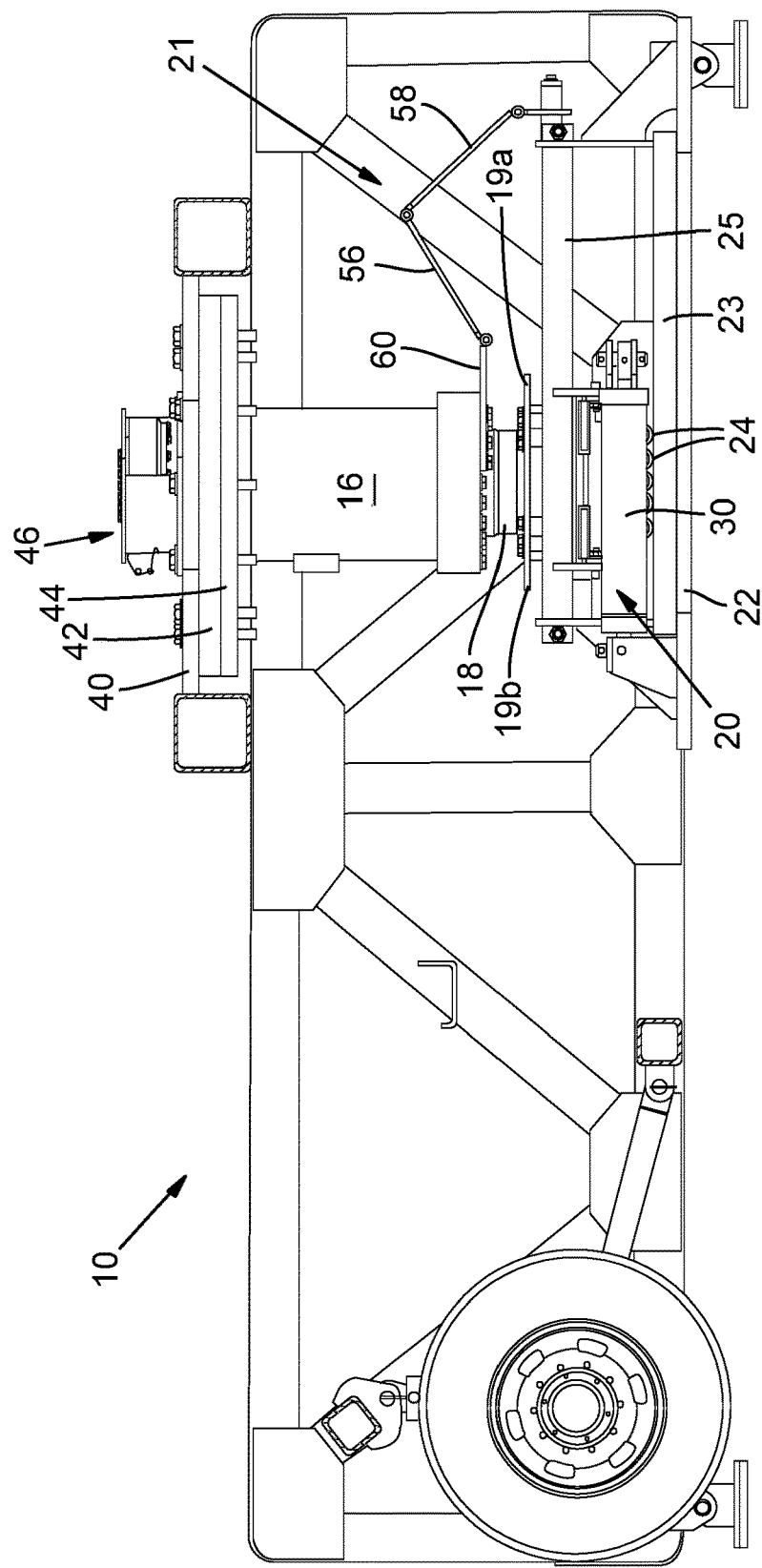
FIGS. 5-8 are side elevational views of the lifting jack assembly as it is used in a method in accordance with the present disclosure.
Figure 6:
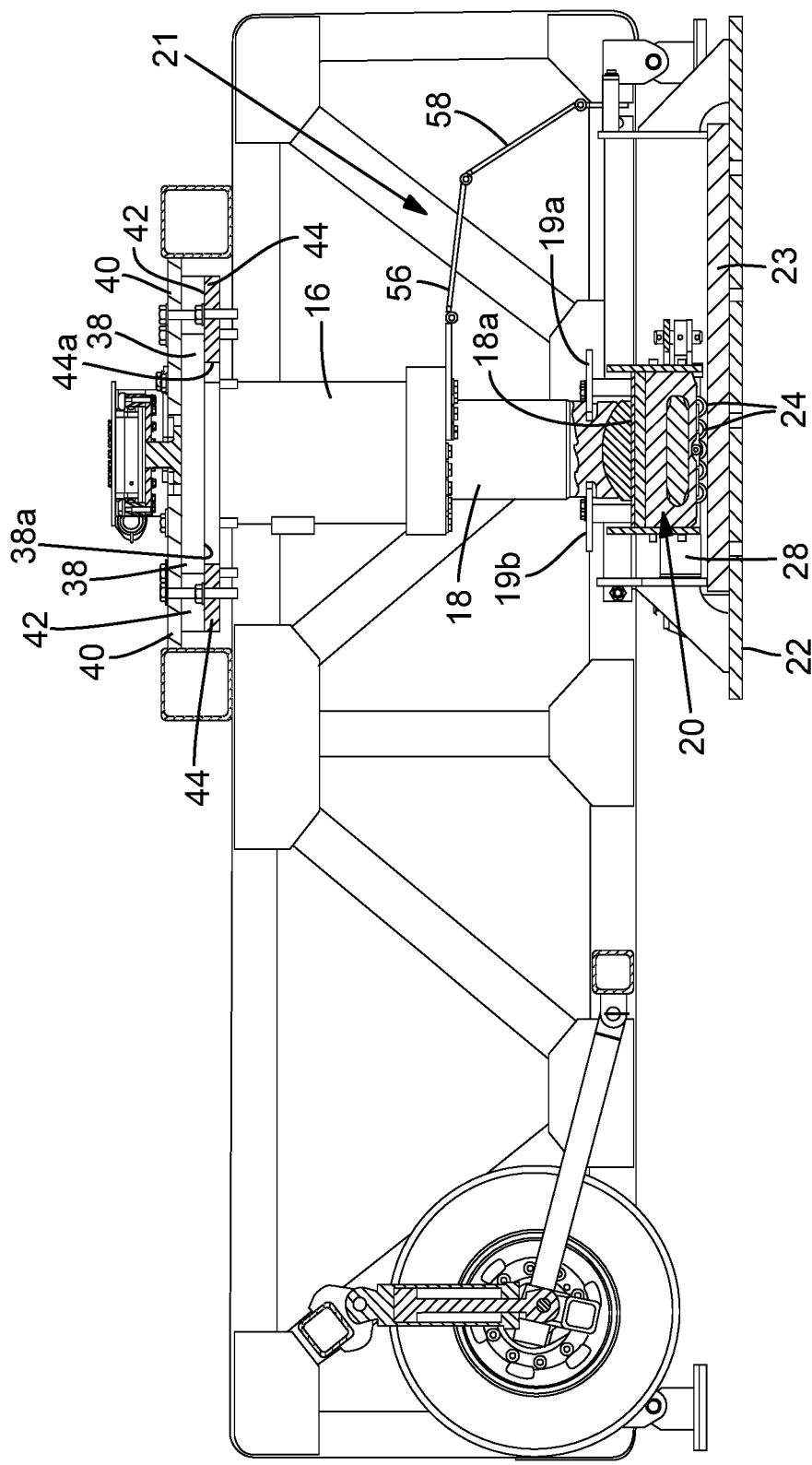

As shown in FIG. 5, lift cylinder 16 has been actuated to retract rod 16, and foot plate 22 will be lifted off the ground, so that the walking machine (here just the test structure is shown) will rest entirely on the ground. (There will be no wheels on the walking machine.) FIG. 6 is the same view, with portions shown in cross section to illustrate various components of the lifting jack assembly. Roller assembly 20 has been shifted to the left, relative to foot plate 22 by the retraction of the rods of the travel cylinders, one of which is shown at 30. The orientation here is a retracted lift cylinder rod, and a retracted travel cylinder. In a full-size walking machine, the rods of the lift cylinders are retracted to disengage their respective foot plates from the ground and thereby lower the walking machine to engage and be supported on the ground.

It will be noted that in FIG. 5 linkage assembly 21 is positioned with first hinge plate 56 and second hinge plate 58 in the orientation shown, spread-apart and non-contacting. In this position rotating the lift cylinders about their vertical axes to a preselected position for steering can now take place. Rotation is shown in the views of FIGS. 10 and 11, to the left and right, respectively, whereby linkage assembly 21 simultaneously imparts rotation to foot plate 22 and roller assembly 20 as a unit to orient and fix the direction of travel of the walking machine in a preselected direction, such as complementary steering, simple steering, etc.

Figure 7:
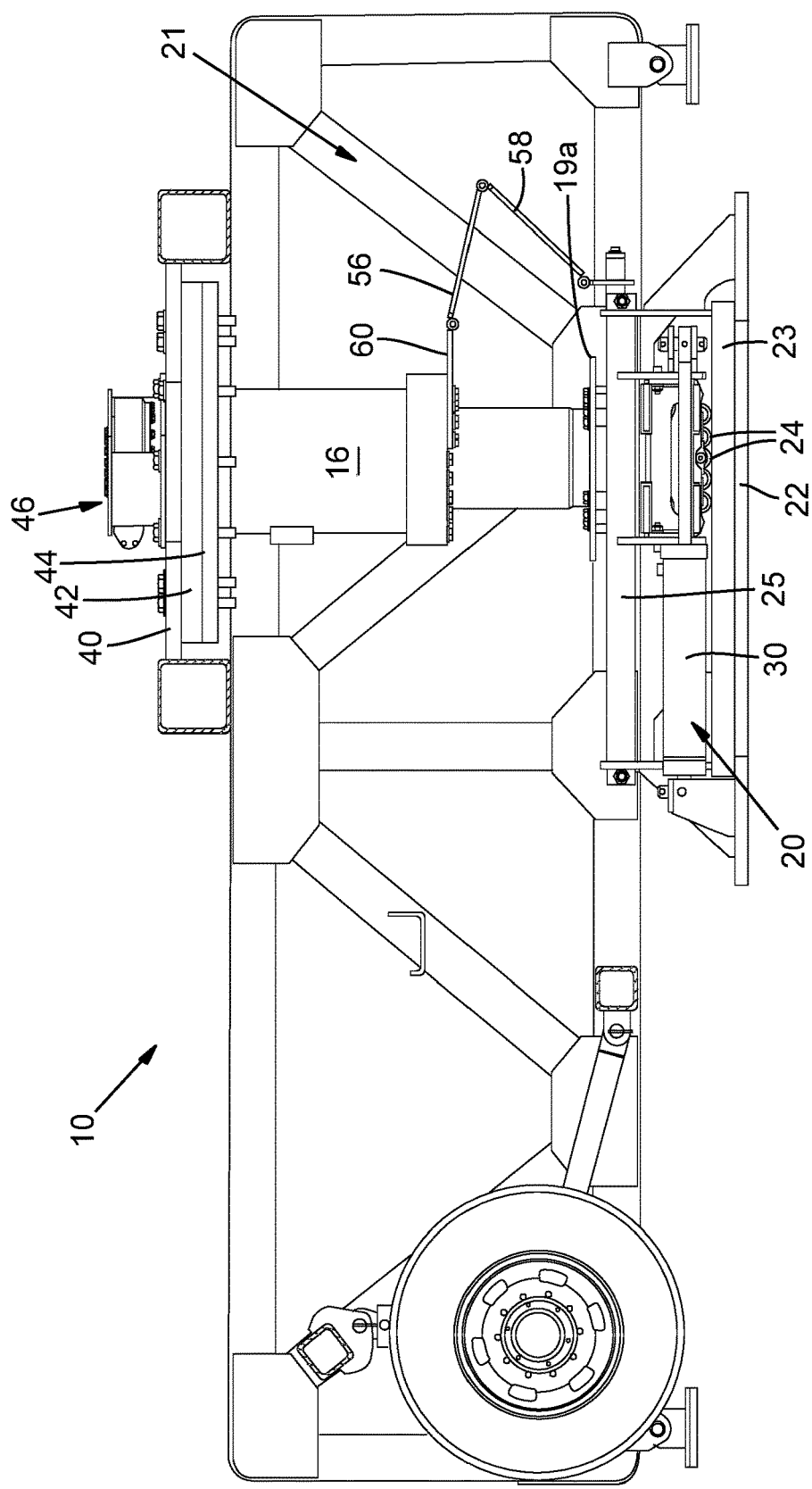
Figure 8:
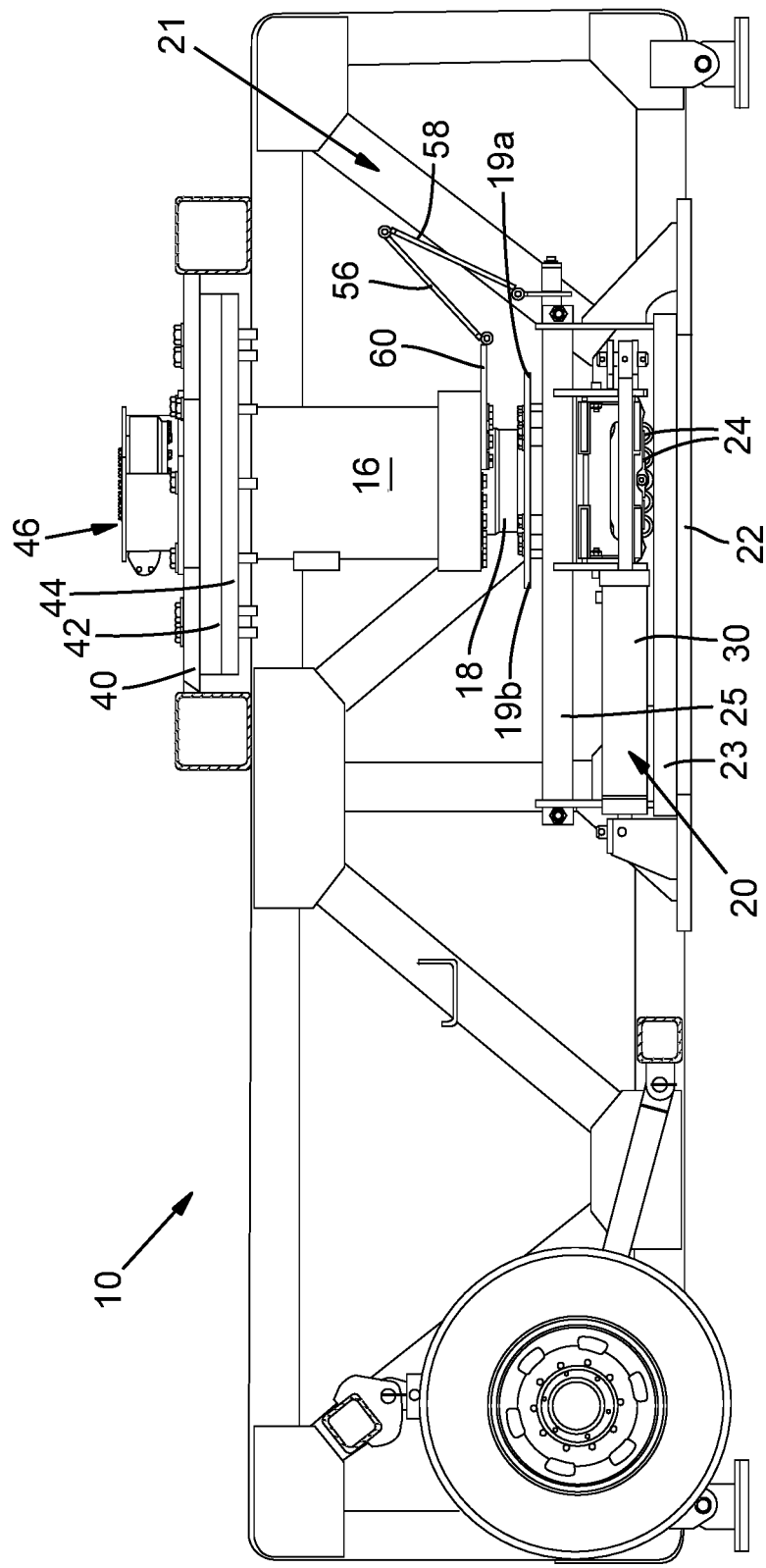

The next step is shown in FIG. 7 where lift cylinder 16 has been actuated to extend rod 18 to urge the foot plate against the ground and thereby lift the walking machine off the ground with its weight being supported by the lifting jack assembly. Now, as shown in FIG. 8, the travel cylinder is actuated to shifting the walking machine to the right, along the foot plate in the preselected direction of travel established by the lift cylinder. In this position it can be seen that the hinge plates have folded toward one another to their maximum extent. With the construction shown, the lift cylinder is always connected to the foot plate, and the linkage assembly permits relative shifting of the foot plate relative to the lift cylinder in a rectilinear direction, as well as permitting rotation of the cylinder, about its vertical axis, to be imparted simultaneously to the foot plate to preselect a steering mode or direction.

I claim:

1. A lifting jack assembly for use on a walking machine to raise it off the ground and preselect a steering direction before the walking machine is lowered onto the ground for travel therealong comprising:
   a hydraulic power-driven lift cylinder mounted on the walking machine operable for actuating an extendable/retractable rod, wherein the lift cylinder is rotatable about its vertical axis;
   a roller assembly provided with rollers mounted adjacent a lower end of the rod;
   a foot plate mounted below the roller assembly for engaging the rollers;
   a power-driven shifter mechanism mounted on the foot plate and connected to the roller assembly selectively operable for shifting the roller assembly in a preselected horizontal direction along the foot plate;
   a linkage assembly interconnecting the lift cylinder to the foot plate; and
   a steering mechanism including a drive mechanism connected to the lift cylinder operable for rotating the lift cylinder about its vertical axis to a preselected position whereby the linkage assembly simultaneously imparts the rotation to the foot plate and the roller assembly as a unit to orient and fix the direction of travel of the walking machine in a preselected direction.

2. The lifting jack assembly of claim 1 further including:
   a flange formed at the upper end of the lift cylinder; and
   a housing structure for mounting on the walking machine provided for engaging the flange thereby enabling the lift cylinder to be rotated about its vertical axis to a predetermined position.

3. The lifting jack assembly of claim 2 wherein the housing structure includes:
   a first mounting plate supported by the walking machine;
   a spacer plate connected to the first mounting plate and spaced-apart therefrom, the spacer plate including a first central bore dimensioned to receive the flange and permit the flange to be rotated therewithin;
   a second mounting plate secured to the first mounting plate and separated therefrom by the spacer plate, the second mounting plate including a second central bore dimensioned with a diameter less than the outer diameter of the flange and aligned with the vertical axis of the lift cylinder for receiving and retaining the lift cylinder with a bottom surface of the flange engaging the upper surface of the second mounting plate.

4. The lifting jack assembly of claim 3 wherein the drive mechanism is supported on the first mounting plate above the flange and includes a drive shaft assembly connected to the flange operable for rotating the lift cylinder about its vertical axis to a preselected position.

5. The lifting jack assembly of claim 4 wherein the first mounting plate includes a bore, and wherein the drive shaft assembly includes a shaft connected to the drive mechanism and extending through the bore of the first mounting plate for connection to the flange of the lift cylinder and imparting rotation to the flange and the lift cylinder from the drive mechanism.

6. The lifting jack assembly of claim 5 wherein the drive mechanism includes a slew drive maintained in position on the first mounting plate by stationary ring mount members.

7. The lifting jack assembly of claim 6 wherein the linkage assembly interconnecting the lift cylinder to the foot plate includes first and second hinge plates pivotally connected to each other, wherein the first hinge plate is also pivotally connected to the lift cylinder and the second hinge plate is also pivotally connected to the foot plate so that rotation of the lift cylinder simultaneously imparts rotation to the foot plate to orient it in a desired steered position, regardless of the extent of extension or retraction of the rod relative to the lift cylinder.

8. The lifting jack assembly of claim 7 wherein the first and second hinge plates are dimensioned lengthwise to pivot away from one another about their common pivot connection as the rod is extended, and pivot or fold toward one another as the rod is retracted.

9. The lifting jack assembly of claim 8 wherein the shifter mechanism includes a power-driven travel cylinder having an extendable/retractable rod, wherein a first end of the travel cylinder is connected to the foot plate and the rod is connected to the roller assembly; and
   wherein the travel cylinder is selectively operable for extending the rod to shift the roller assembly in a first direction relative to the foot plate and for retracting the rod to shift the roller assembly in a second direction opposite to the first direction relative to the foot plate.

10. A lifting jack assembly for use on a walking machine to raise it off the ground and preselect a steering direction before the walking machine is lowered onto the ground for travel therealong comprising:
   a hydraulic power-driven lift cylinder mounted on the walking machine operable for actuating an extendable/retractable rod, wherein the lift cylinder is rotatable about its vertical axis;
   a roller assembly provided with rollers mounted adjacent a lower end of the rod;
   a foot plate mounted below the roller assembly for engaging the rollers;
   a power-driven shifter mechanism mounted on the foot plate and connected to the roller assembly selectively operable for shifting the roller assembly in a preselected horizontal direction along the foot plate;

a linkage assembly interconnecting the lift cylinder to the foot plate including first and second hinge plates pivotally connected to each other, wherein the first hinge plate is also pivotally connected to the lift cylinder and the second hinge plate is also pivotally connected to the foot plate so that rotation of the lift cylinder simultaneously imparts rotation to the foot plate regardless of the extent of extension or retraction of the rod relative to the lift cylinder; and a steering mechanism including a drive mechanism connected to the lift cylinder operable for rotating the lift cylinder about its vertical axis to a preselected position whereby the linkage assembly simultaneously imparts the rotation to the foot plate and the roller assembly as a unit to orient and fix the direction of travel of the walking machine in a preselected direction.

11. A method for transporting and steering a walking machine in a preselected direction comprising:

providing a plurality of lifting jack assemblies on the walking machine, each of which includes a hydraulic power-driven lift cylinder rotatable about its vertical axis and operable for actuating an extendable/retractable rod, a roller assembly provided with rollers mounted adjacent a lower end of the rod, a foot plate mounted below the roller assembly for engaging the rollers and a linkage assembly interconnecting the lift cylinder to the foot plate;

retracting the rods of the lift cylinders to disengage their respective foot plates from the ground and thereby lower the walking machine to engage and be supported on the ground;

rotating the lift cylinders about their vertical axes to a preselected position whereby the linkage assemblies simultaneously impart the rotation to their associated foot plates and the roller assemblies as a unit to orient and fix the direction of travel of the walking machine in a preselected direction;

extending the rods of the lift cylinders to urge the foot plates against the ground and thereby lift the walking machine off the ground with its weight being supported by the lifting jack assemblies; and shifting the walking machine along the foot plates in the preselected direction of travel established by the lift cylinders.

\* \* \* \* \*